United States Patent [19]
Savoca et al.

[11] Patent Number: 5,236,964
[45] Date of Patent: Aug. 17, 1993

[54] PROCESS FOR PREPARING REDUCED DENSITY, WATER BLOWN MDI-BASED POLYURETHANE FOAMS

[75] Inventors: Ann C. L. Savoca, Wyomissing; Alan M. Franson, Coplay, both of Pa.

[73] Assignee: Air Products and Chemicals, Inc., Allentown, Pa.

[21] Appl. No.: 985,386

[22] Filed: Dec. 4, 1992

[51] Int. Cl.$^5$ .......................... C08G 18/08; C08J 9/12
[52] U.S. Cl. ..................... 521/105; 521/117; 521/129; 521/155; 521/170
[58] Field of Search .............. 521/105, 117, 129, 155, 521/170

[56] References Cited

U.S. PATENT DOCUMENTS

| | | | |
|---|---|---|---|
| 4,833,176 | 5/1989 | Wolf et al. | 521/160 |
| 5,006,569 | 4/1991 | Stone | 521/118 |
| 5,086,081 | 2/1992 | Savoca et al. | 521/103 |
| 5,104,907 | 4/1992 | Yoshimura et al. | 521/128 |
| 5,130,403 | 7/1992 | Savoca et al. | 528/48 |

FOREIGN PATENT DOCUMENTS 2232990A 2/1991 United Kingdom .

*Primary Examiner*—Morton Foelak
*Attorney, Agent, or Firm*—Michael Leach; James C. Simmons; William F. Marsh

[57] ABSTRACT

A method for preparing a reduced density MDI based polyurethane foam by reacting a polyol with an MDI composition using at least 4 parts by weight water based on 100 parts of polyol as the blowing agent and a catalyst composition consisting essentially of the addition product of triethylenediamine and a boron compound of the formula $$R_nB(OH)_{3-n}$$

where $n=0$ or 1, and $R=C_1-C_8$ alkyl, $C_5-C_8$ cycloalkyl or $C_6-C_{10}$ aryl.

14 Claims, No Drawings

PROCESS FOR PREPARING REDUCED DENSITY, WATER BLOWN MDI-BASED POLYURETHANE FOAMS

TECHNICAL FIELD

In the production of polyurethane foam, toluene diisocyanate (TDI) and diphenylmethane diisocyanate (MDI) are the most commonly used isocyanates. Since isocyanates are generally toxic and require specific handling procedures, a low vapor pressure isocyanate, such as MDI, offers an advantage over the higher vapor pressure TDI because it is less likely to be an air-borne contaminant in the working environment. Unfortunately, MDI is more viscous, has flowability problems, and does not readily afford foams of low density. Although non-reactive blowing agents such as trichlorofluoromethane (CFC-11), dichlorotrifluoroethane (HCFC-141b), and methylene chloride have been used to achieve reduced density MDI foams without loss of initial system flowability, these materials are volatile organics which ultimately contaminate the atmosphere, and in the case of CFC-11 and HCFC-141b are destroying the earth's ozone layer. The industry trend is replace these materials with water. Unfortunately, the use of water as a blowing agent poses additional problems. With foam formulations having higher water levels, foams become less stable, foam physical properties are altered and low density is not easily achieved.

U.S. Pat. No. 5,006,569 discloses the production of flexible polyurethane foams of reduced density through the reaction, in the presence of a catalyst, of an isocyanate, one or more blowing agents including water, a foam stabilizer, a polyether polyol, and a liquid salt produced from the reaction of carbon dioxide with a water-soluble amine or amino alcohol.

U.S. Pat. No. 5,104,907 discloses the production of high resilience, lower density polyurethane foams by reacting a polyol with diphenylmethane diisocyanate in the presence of a substituted imidazole as a catalyst, a blowing agent and a foam stabilizer.

GB 2,232,990A discloses the production of high resilience polyurethane foams having both low density (less than 35 kg/m$^3$) and an improved skin aspect by preparing a formulation from (a) one or more polyols, (b) at least 3.0 parts by weight water per one hundred parts of polyol, (c) one or more isocyanates having a functionality greater than or equal to 2, (d) a foam stabilizer and (e) one or more catalysts for the formation of urethane linkages from (a) and (c), at least one of the catalysts being an amine which has been blocked with an organic acid.

U.S. Pat. No. 4,833,176 discloses a process for the preparation of cold setting, flexible polyurethane molded foams in a closed mold by reacting a polyisocyanate with a high molecular weight polyol in the presence of about 5 to 15 parts by weight of water, based on the weight of the high molecular weight polyol at an isocyanate index below 70.

U.S. Pat. No. 5,086,081 discloses an amine-boron composition for catalyzing the urethane reaction, particularly in preparing a polyurethane foam, consisting essentially of the addition product of a tertiary amine and a boron compound. Preferred catalysts are prepared by mixing triethylenediamine with boric acid.

SUMMARY OF THE INVENTION

The present invention provides a process for producing a reduced density polyurethane foam by reacting a polyol with a diphenylmethane diisocyanate (MDI) in the presence of a catalyst, water as blowing agent, and, optionally, a surfactant. The blowing agent water is present in an amount of at least 4 parts by weight (pbw) based on 100 pbw of polyol, i.e., a high water foam formulation. For the purpose of this invention, the term "MDI" includes any polyisocyanate composition comprising diphenylmethane diisocyanate (MDI), mixtures of MDI with other isomeric and analogous higher polyisocyanates, or an MDI-derived isocyanate prepolymer comprising a partially prereacted mixture of MDI and polyether or polyester polyols. The catalyst employed in these high water MDI polyurethane foam formulations for producing a reduced density foam is the adduct of a tertiary amine urethane catalyst and a boron compound of the formula $$R_nB(OH)_{3-n}$$

where
 $n=0$ or 1, and
 $R=C_1-C_8$ alkyl, $C_5-C_8$ cycloalkyl or $C_6-C_{10}$ aryl.

As an advantage of this process there is a significant reduction in the density of such high water, MDI derived foams.

Another embodiment of the invention is a high water, MDI-containing polyurethane foam forming composition for making reduced density foams comprising a polyol, MDI, the above-defined catalyst, water as blowing agent in an amount of at least 4 pbw based on 100 pbw of the polyol, and, optionally, a surfactant.

DETAILED DESCRIPTION OF THE INVENTION

The polyisocyanate composition used in the present invention for preparing polyurethane foams comprises MDI and/or a derivative thereof. The MDI derivatives include, for example, a mixture of MDI with a polyphenylene polymethyl diisocyanate (i.e., polymeric MDI) and prepolymers of a partially prereacted mixture of MDI and polyether or polyester polyols.

Illustrative of suitable polyols as a component of the polyurethane composition are the polyalkylene ether and polyester polyols. The polyalkylene ether polyols include the poly(alkylene oxide) polymers such as poly(ethylene oxide) and poly(propylene oxide) polymers and copolymers with terminal hydroxyl groups derived from polyhydric compounds, including diols and triols; for example, among others, ethylene glycol, propylene glycol, 1,3-butane diol, 1,4-butane diol, 1,6-hexane diol, neopentyl glycol, diethylene glycol, dipropylene glycol, pentaerythritol, glycerol, diglycerol, trimethylol propane and like low molecular weight polyols.

In the practice of this invention, a single high molecular weight polyether polyol may be used. Also, mixtures of high molecular weight polyether polyols such as mixtures of di- and tri-functional materials and/or different molecular weight or different chemical composition materials may be used.

Useful polyester polyols include those produced by reacting a dicarboxylic acid with an excess of a diol, for example, adipic acid with ethylene glycol or butanediol, or reacting a lactone with an excess of a diol such as caprolactone with propylene glycol.

In addition to the polyether and polyester polyols, the masterbatches, or premix compositions, frequently contain a polymer polyol. Polymer polyols are used in polyurethane foam to increase the foam's resistance to deformation, i.e. to increase the load-bearing properties of the foam. Currently, two different types of polymer polyols are used to achieve load-bearing improvement. The first type, described as a graft polyol, consists of a triol in which vinyl monomers are graft copolymerized. Styrene and acrylonitrile are the usual monomers of choice. The second type, a polyurea modified polyol, is a polyol containing a polyurea dispersion formed by the reaction of a diamine and TDI. Since TDI is used in excess, some of the TDI may react with both the polyol and polyurea. This second type of polymer polyol has a variant called PIPA polyol which is formed by the in-situ polymerization of TDI and alkanolamine in the polyol. Depending on the load-bearing requirements, polymer polyols may comprise 20–80% of the polyol portion of the masterbatch.

Other typical agents found in the polyurethane foam formulations include chain extenders such as ethylene glycol and butanediol; crosslinkers such as diethanolamine, diisopropanolamine, triethanolamine and tripropanolamine; and cell stabilizers such as silicone surfactants.

The blowing agent of the present invention is water. Suitable use levels of water in the high water foam formulations are 4 parts by weight (pbw) or more based on 100 pbw of polyol. Preferred water levels are 4.5 to 7 pbw, most preferably 5 to 6 pbw. Below 4.5 pbw water, foam tightness is frequently a problem; above 7 pbw water, there are signs of foam instability. Although an all water blowing agent composition is highly preferred, other blowing agents known in the art, such as pentane, methylene chloride, CFCs and HCFCs, can be used with the water.

The urethane catalyst composition used to make the low density polyurethane foam consists essentially of the addition product, or adduct, of a tertiary amine urethane catalyst and a boron compound of the general formula:

where
n is 0 or 1, and
R is $C_1$-$C_8$ alkyl, $C_5$-$C_8$ cycloalkyl or $C_6$-$C_{10}$ aryl.

Alkyl groups would include, for example, methyl, ethyl, butyl, ethylhexyl and the like; cycloalkyl would include, for example, cyclopentyl, cyclohexyl and the like; and aryl groups would include, for example, phenyl, p-tolyl and the like.

Exemplary of suitable boron compounds are boric acid, phenylboronic acid and isopropylboronic acid. The preferred boron compound is boric acid where n is 0. Contemplated as functional equivalents to boric acid for purposes of this invention are the borate esters, i.e., alkyl-, dialkyl- and trialkylborates, in which the alkoxy groups hydrolyze to the hydroxyl functionality in the presence of water.

It is also contemplated that any tertiary amine suitable as a urethane catalyst can be used in making the amine-boron adduct catalyst composition. Illustrative of suitable tertiary amine urethane catalysts are pentamethyldiethylenetriamine, pentamethyldipropylenetriamine, bis(dimethylaminoethyl) ether, dimethylcyclohexylamine, N,N,N'-trimethyl-N'-hydroxyethylethylenediamine, triethylenediamine ("TEDA") and the like.

Typical molar ratios of tertiary nitrogen to boron in making the catalyst composition are from 1:0.01 to 1:100, preferably 1:0.1 to 1:10, most preferably 1:0.5 to 1:1.

Such catalyst compositions are generally easily handled solids which are prepared by precipitation from appropriate solvents upon mixing the tertiary amine with the boron compound at temperatures from ambient (or lower) to about 50° C., i.e. without substantial heating, and any convenient pressure, especially atmospheric pressure. In addition, solid adducts are afforded upon mixing the tertiary amine and the boric acid in a non-solvent for the adduct, again without the need for substantial heating. For example, TEDA and boric acid can be blended in tetrahydrofuran or methoxyethoxyethanol to yield a solid product.

The amine-boron adducts are also easily prepared and more conveniently delivered as solutions in carriers such as water, alcohols, polyols, amines, polyamines, ethers, hydrocarbons and chlorinated hydrocarbons. The preferred carriers are water, alcohols and polyols. The more preferred carriers are standard polyurethane additives such as water, crosslinkers (e.g., diethanolamine), chain extenders (e.g., butanediol), and higher molecular weight polyether and polyester polyols. When using phenylboronic acid, it is preferred first to dissolve the tertiary amine in the carrier and then add the phenylboronic acid.

A catalytically effective amount of the catalyst composition is used in the polyurethane formulation. More specifically, suitable amounts of the catalyst composition may range from about 0.01 to 10 pbw per 100 parts polyol in the polyurethane formulation.

The catalyst compositions may be used in combination with other tertiary amine, organotin, and carboxylate urethane catalysts well known in the urethane art.

A general high water polyurethane flexible foam formalation according to the invention would comprise the following components in parts by weight (pbw):

| Flexible Foam Formulation | |
|---|---|
| | Parts by Weight |
| Polyol | 20–100 |
| Polymer Polyol | 80–0 |
| Silicone Surfactant | 1–2.5 |
| Water | 4–7.5 |
| Crosslinker | 0.5–2 |
| Catalyst | 0.5–2 |
| MDI Isocyanate Index | 70–115 |

The process of the present invention results in the production of reduced density, high water flexible foams based on diphenylmethane diisocyanate.

EXAMPLE 1

A 1:2 molar mixture of triethylenediamine ("TEDA") and boric acid was prepared according to Example 4 of U.S. Pat. No. 5,086,081 by dissolving one molar equivalent of TEDA and two molar equivalents of boric acid at 50 wt% solids in water.

COMPARATIVE EXAMPLE 2 AND EXAMPLE 3

The following flexible foam formulations were used:

| | Comp Example 2 | Example 3 |
|---|---|---|
| Voranol CP6001[a] | 100 pbw | 100 pbw |
| Diisopropanolamine (15% Water) Crosslinker | 1.0 pbw | 1.0 pbw |
| Dabco ® DC-5418 Silicone Surfactant | 1.0 pbw | 1.0 pbw |
| Water (Total) | 2.9–7.0 pbw | 2.9–7.0 pbw |
| Dabco 33-LV ® Catalyst | 0.80 pbw | |
| Dabco ® BL-11 Catalyst | 0.20 pbw | |
| Example 1 Catalyst | | 3.30 pbw |
| Mondur MRS 2.5 Isocyanate (80 Index)[b] | 41.0–88.7 pbw | 41.0–88.7 pbw |

[a]conventional polyether polyol supplied by Dow Chemical Inc.
[b]polymeric MDI supplied by Miles, Inc.

Foam components were used at lab temperature (72°±2° F.; 22°±1° C.). All experiments were run at a total system weight (polyol+additives+isocyanate) of 90 grams. Each component for the resin side was weighed and combined into a preweighed 32 ounce (951 ml) paper cup. The mixture was agitated for 10 seconds at 12000 RPM using an overhead stirrer fitted with a 2 inch (5.1 cm) diameter stirring paddle. The isocyanate required was weighed into a "wet tared" 250 ml plastic beaker. The isocyanate was added to the polyol blend, then the mixture agitated for 6 seconds at 12000 RPM using the same stirrer. Free rise density was measured by cutting the crown of the foam at the top of the cup. The cup/foam was weighed, and the cup weight subtracted. The density was calculated by dividing the foam weight by the volume of the 32 ounce cup. Full rise height was measured with a Mitutoyo height guage. Table 1 summarizes the data.

TABLE 1

| | Foam Height (mm) | | Free Rise Density (pcf; kg/m³) | |
|---|---|---|---|---|
| Water Level | Comparative Example 2 | Example 3 | Comparative Example 2 | Example 3 |
| 2.9 | 228 | 254 | 4.13; 66.2 | 3.39; 54.3 |
| 3.5 | 237 | 269 | 3.80; 60.9 | 2.92; 46.8 |
| 4.0 | 243 | 280 | 3.56; 57.0 | 2.92; 46.8 |
| 4.5 | 251 | 285 | 3.10; 47.0 | 2.65; 42.5 |
| 5.0 | 270 | 296 | 2.88; 46.1 | 2.38; 38.1 |
| 6.0 | 261 | 299 | 2.63; 42.1 | 2.28; 36.5 |
| 7.0 | Collapse | 312 | 3.16; 50.6 | 2.26; 36.2 |

These data show increased foam height and decreased density for the entire water level range 2.9–7.0 when Example 3 catalyst (a combination of triethylenediamine and boric acid) was substituted for the conventional catalyst combination, DABCO 33-LV/DABCO BL-11. The reduction in foam density was most dramatic over the water level range of 4.5 to 7.

Statement of Industrial Application

The present invention provides for a high water, MDI-based polyurethane foam having reduced density.

We claim:

1. In a method for preparing an MDI based polyurethane foam by reacting a polyol with an MDI composition in the presence of a catalyst, a blowing agent, and, optionally, a surfactant, the improvement which comprises using at least 4 parts by weight water based on 100 parts of polyol as the blowing agent and employing a catalyst composition consisting essentially of the addition product of triethylenediamine and a boron compound of the formula

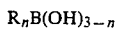

$$R_nB(OH)_{3-n}$$

where
n = 0 or 1, and
R = $C_1$-$C_8$ alkyl, $C_5$-$C_8$ cycloalkyl or $C_6$-$C_{10}$ aryl.

2. The method of claim 1 in which the catalyst composition is employed in combination with a tertiary amine urethane catalyst, an organotin urethane catalyst, or a carboxylate urethane catalyst or combination thereof.

3. The method of claim 1 in which the boron compound is boric acid, phenylboronic acid or isopropylboronic acid.

4. The method of claim 1 in which the boron compound is boric acid.

5. The method of claim 1 in which the tertiary nitrogen to boron molar ratio of the catalyst composition is 1:0.1 to 1:10.

6. The method of claim 1 in which the tertiary nitrogen to boron molar ratio of the catalyst composition is 1:0.5 to 1:1.

7. The method of claim 4 in which the tertiary nitrogen to boron molar ratio of the catalyst composition is 1:0.5 to 1:1.

8. The method of claim 7 in which the catalyst composition is employed in combination with a tertiary amine urethane catalyst or an organotin urethane catalyst, or both.

9. The method of claim 1 in which the amount of water is 4.5–7 parts by weight water per 100 parts of polyol.

10. In a method for preparing an MDI based polyurethane foam by reacting a polyol with an MDI composition in the presence of a catalyst, a blowing agent, and, optionally, a surfactant, the improvement which comprises using at least 4 parts by weight water based on 100 parts of polyol as the blowing agent and employing a catalyst composition consisting essentially of the addition product of triethylenediamine and boric acid.

11. The method of claim 10 in which the amount of water is 4.5–7 parts by weight water per 100 parts of polyol.

12. The method of claim 11 in which the tertiary nitrogen to boron molar ratio of the catalyst composition is 1:0.5 to 1:1.

13. The method of claim 12 in which the amount of water is 5–6 parts by weight water per 100 parts of polyol.

14. The method of claim 12 in which the catalyst composition is employed in combination with a tertiary amine urethane catalyst or an organotin urethane catalyst, or both.

* * * * *